United States Patent [19]

Peterson

[11] Patent Number: 4,949,896
[45] Date of Patent: Aug. 21, 1990

[54] TECHNIQUE OF ASSEMBLING STRUCTURES USING VAPOR PHASE SOLDERING

[75] Inventor: Noel C. Peterson, Severna Park, Md.

[73] Assignee: The United States of America as represented by the Secretary of the Air Force, Washington, D.C.

[21] Appl. No.: 663,015

[22] Filed: Oct. 19, 1984

[51] Int. Cl.⁵ .............................................. B23K 1/20
[52] U.S. Cl. .................................... 228/205; 228/207; 29/600
[58] Field of Search ........... 228/205, 207, 208, 263.17, 228/243, 126; 29/600

[56] References Cited

U.S. PATENT DOCUMENTS

| | | |
|---|---|---|
| Re. 30,399 | 9/1980 | Ammann et al. ................ 228/180 R |
| 2,756,497 | 7/1956 | Gale ..................... 228/207 |
| 3,063,145 | 11/1962 | Bouton ..................... 29/499 |
| 3,242,565 | 3/1966 | North ..................... 228/205 |
| 3,286,120 | 11/1966 | Peterson et al. ..................... 315/3.6 |
| 3,372,471 | 3/1968 | Kuhn ..................... 29/600 |
| 3,588,759 | 6/1971 | Buck et al. ..................... 333/84 |
| 3,621,479 | 11/1971 | Peterson et al. ..................... 333/22 R |
| 3,638,226 | 1/1972 | Brooks et al. ..................... 343/895 |
| 3,675,310 | 7/1972 | Schwaneke ..................... 228/205 |
| 3,899,720 | 8/1975 | Peterson ..................... 317/101 D |
| 3,909,209 | 9/1975 | Kruper ..................... 228/209 |
| 3,914,861 | 10/1975 | Phillips ..................... 29/600 |
| 3,918,623 | 11/1975 | Ishiguro ..................... 228/126 |
| 4,268,585 | 5/1981 | Daur et al. ..................... 428/622 |
| 4,385,310 | 5/1983 | Aouston ..................... 228/243 |
| 4,392,049 | 7/1983 | Bentley et al. ..................... 219/401 |

FOREIGN PATENT DOCUMENTS 632091  12/1961  Canada ..................... 228/205

Primary Examiner—Kurt Rowan
Attorney, Agent, or Firm—Stanton E. Collier; Donald J. Singer

[57] ABSTRACT

A process for assembling parts of a lightweight structure of aluminum having a multitude of joints. The process includes the following steps:
(1) cleaning surfaces of all the parts;
(2) selectively depositing on the surfaces a layer of nickel and then tin;
(3) selectively plating on the tin layer where joints occur a lead/tin eutectic alloy solder;
(4) add flux;
(5) fixturing the parts together to form the structure;
(6) heating the structure in a vapor phase apparatus;
(7) removing the structure from the fixture; and
(8) cleaning the structure.

By using the above process an antenna faceplate having over 3000 joints was soldered.

1 Claim, 2 Drawing Sheets

TECHNIQUE OF ASSEMBLING STRUCTURES USING VAPOR PHASE SOLDERING

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a process of joining metal parts and, more particular, relates to vapor phase soldering of aluminum parts.

In the past, metal parts were joined by such methods as dip brazing, soldering, wave soldering, etc.

Waveguide assemblies, for example, some of them quite complicated structurally, can be joined by dip brazing. While this joining method is reasonably satisfactory, there are two disadvantages: the high temperature (1100°F.) can cause physical distortion of the parts; and the flux used in dip brazing is a powerful chemical which removes surface oxide from aluminum so the braze metal can flow. In doing so it attacks all surfaces. This can be detrimental in waveguide interiors since the resulting surface roughness attributes to microwave loss. Residues of brazing flux trapped in corners and crevices are difficult to remove after cooling, and if left there, can lead to corrosion. Some advantages of dip brazing are: parts can be tack welded into position which minimizes fixturing; and all the joints in the assembly are made in one dip operation. But when the apparatus has a high number of joints, etc. then this can become a very time consuming operation. Finally, dip brazing is useful for aluminum parts only whereas the vapor process will work for any metal that accepts solder wetting or which can be electroplated for that purpose.

Another joining method is soldering which is excellent for brass or copper waveguides but when applied to aluminum, the parts have to be electroplated with a metal which will accept solder wetting. Assemblies of multiple parts can be soldered with a torch or a soldering iron as long as care is taken to localize the heat so that previously made joints are not remelted and so that solder does not stay molten long enough to dissolve the electroplated layers.

Wave soldering, an another method, can only be used on one flat surface at a time.

The present invention is directed toward providing a process of joining aluminum parts of a complex structure in which these undesirable characteristics are minimized or removed.

SUMMARY OF THE INVENTION

The present invention overcomes the problems encountered in the past and described hereinabove by providing a vapor phase process of assembling complex structures of aluminum.

For example, the present invention was used to assemble a faceplate for an agile beam phased array antenna. This structure has two sheets of thin aluminum having a pattern of holes therethrough which correspond to the locations of the radiating elements in the phased array antenna. The sheets are parallel and held in that position by aluminum sleeves centered at each hole location. In the structure shown hereinafter, there were about 1500 sleeves to be joined by vapor phase soldering to the sheets of alumimun thus providing all most 3000 solder joints. Each sleeve was held in place between the two sheets by two centering inserts that were bolted together on a fixture during soldering. The above structure provided an example of the advantages of the present invention.

The vapor phase soldering process involves the heating of a structure by immersion of the structure into the saturated vapor of a working liquid If the temperature of the structure is initially below the temperature of the saturated vapor, condensation takes place on the structure with the consequent transfer to it of the latent heat of the vapor. Thus in condensation or vapor phase soldering hot vapor of a suitable liquid is used to transfer heat quickly, by use of the latent heat of condensation thereof, to a solder preform to melt the solder so that it flows under surface tension effects or melts in place to make a soldered connection. The condensate of the vapor selected is immiscible with the molten solder so that condensation soldering provides a clean environment in which the soldering can take place.

Before the aluminum structure was placed in the vapor phase apparatus, all parts were plated with electroless nickel and then tin. On the inside surface of each sheet a lead/tin eutectic alloy was selectively plated around each hole and then the eutectic alloy was coated with a suitable liquid flux. The parts of the structure were assembled on a fixture which maintained flatness of the structure and location of the sleeves within the structure.

The fixtured structure was heated for two minutes in the vapor phase apparatus during which the plated eutectic alloy flowed in and around the sleeve ends and formed the multitude of solder joints simultaneously. The structure was then cleaned in methyl chloroform to remove residue matter.

One advantage over dip brazing arises from the temperature required. The vapor phase soldering process is absolutely controlled at 215° C. (419° F.) because that is the boiling point of the FC-70 fluorocarbon. On the other hand, dip brazing occurs at 593° C. (1100° F.) which is more difficult to achieve and to control. The higher temperature can cause distortion in the parts and a change of "temper." Whereas, tack welding of parts is often used for dip brazing, certain thin walled pieces can not be tack welded and therefore require fixturing. This leads to the danger of brazing the parts to the fixture.

It is therefore one object of the present invention to provide a process of assembling structures of metal;

It is a further object of the present invention to provide a process wherein a great plurality of joints are simultaneously joined without detrimental effects on the structure;

It is a further object of the present invention to provide a process of joining structures where a low temperature is used and the materials used do not adversely affect the structures.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENTS

Figure 1:
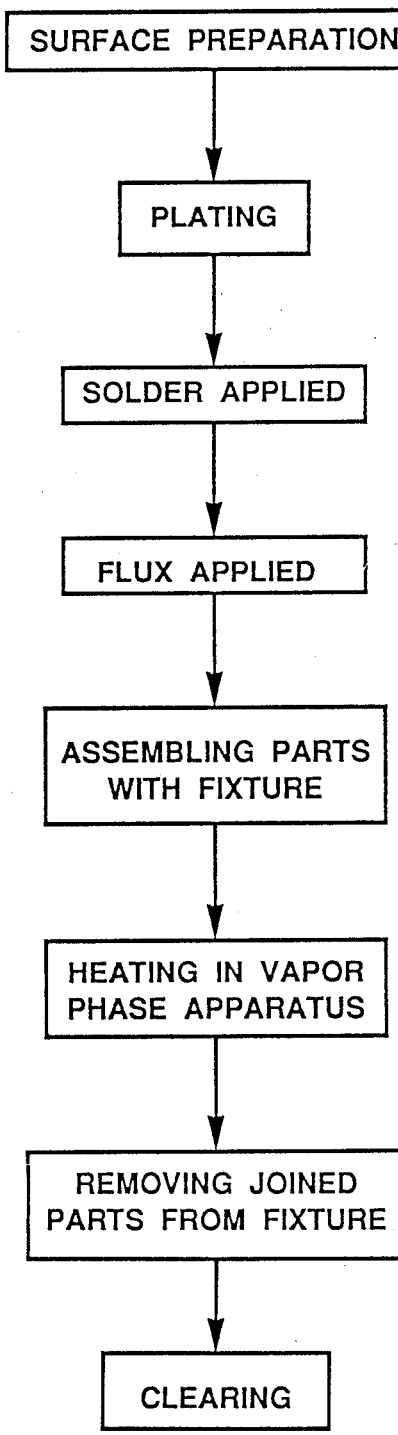
FIG. 1 is a flow chart of the process used by the present invention.

The vapor phase soldering process for assembling structures is shown generally in FIG. 1.

Figure 2:
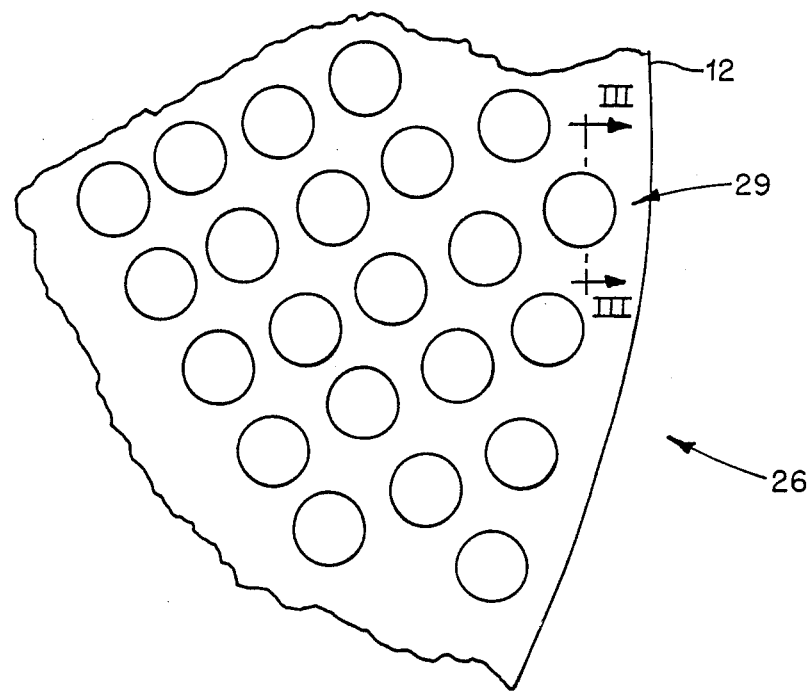
FIG. 2 is a plan view of a faceplate of an agile beam phased array antenna assembled by the process of the present invention.

FIG. 2 illustrates by a partial plan view a faceplate 26 having therein a plurality of holes such as hole 29. Each hole 29 is placed over one active element of an antenna, not shown. Faceplate 26 is constructed of two thin circular sheets 12 and 14, shown partially in FIG. 3, and a sleeve 22 soldered between sheets 12 and 14. Sleeve 22 is a cylindrical tube 23 having flanges 38 and 40 on the ends of tube 23.

Figure 3:
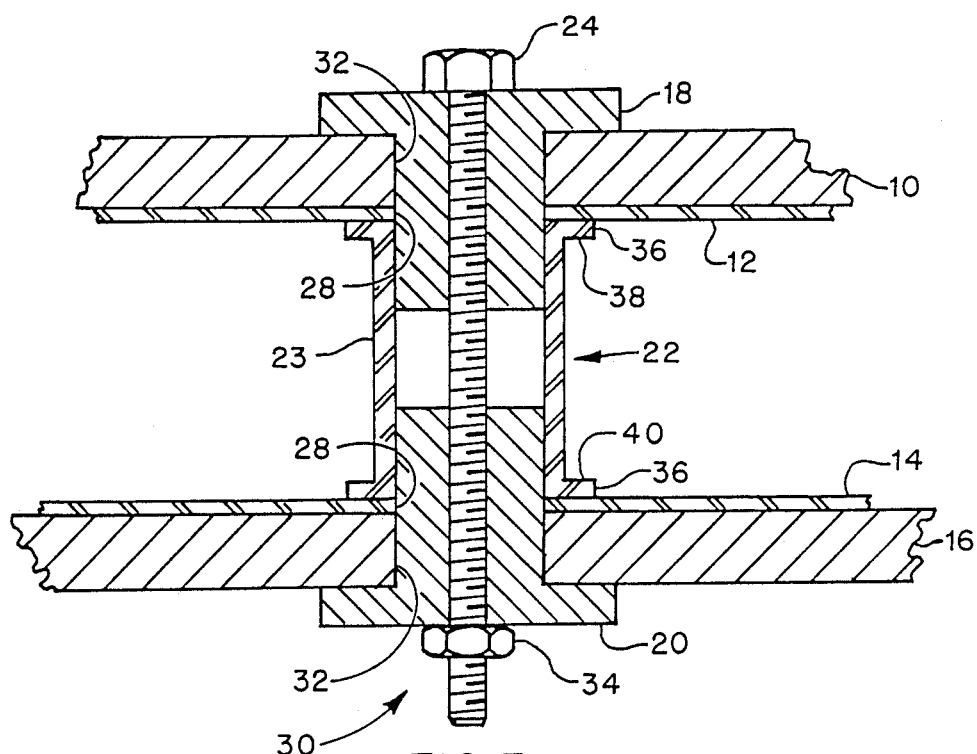
FIG. 3 is a partial cross section along lines III—III of FIG. 2 showing the fixture used to hold a sleeve between two sheets during the process of the present invention.

A fixture 30 that is used to hold sleeve 22 between top sheet 12 and bottom sheet 14 during vapor phase soldering is illustrated in FIG. 3.

Fixture 30 for faceplate 26 has a top plate 10 and a bottom plate 16 also having holes therein such as hole 32 as sheets 12 and 14. Plates 10 and 16 must be sufficiently thick to prevent warping to sheets 12 and 14 during soldering or flexing otherwise. Inserts 18 and 20, being similar, are placed into holes 28 and 32 and extend into sleeve 22 and are of an outside diameter sufficiently close to the inside diameter of sleeve 22 to prevent X-Y movement of sleeve 22. Inserts 18 and 20 thus provide X-Y positioning of sleeve 22. A bolt 24 and nut 34 hold inserts 18 and 20, plates 10 and 16, sheets 12 and 14, and sleeve 22 tightly together during the vapor phase soldering.

In the above arrangement, faceplate 26 and fixture 30 are of the same metallic composition such as aluminum except bolt 24 is made of a material having a smaller coefficient of expansion so that when the above is heated, all joints, such as joints 36 and 38, are forced together to ensure a tight joint.

Before any plating occurs all surfaces are cleaned in a conventional manner to remove grease, dirt, dust, etc. Since sleeve 22 and sheets 12 and 14 are of aluminum, they are next covered with a layer of electroless metal such as nickel, preferably, or copper. Next, all surfaces are plated with a solderable metal such as tin or copper. (If areas of the surfaces must be bare metal, conventional masking can be applied to prevent plating. This is required inside waveguides, for example.)

Where joints are to be made, such as joints 36, solder must be applied by selective electroplating of a eutectic lead/tin alloy. Again masking is used to protect areas that are not joined. Solder may also be applied by preforms made of solder wire or sheet. After joints 36 have the solder applied a layer of flux is applied.

Since plating and tack welding are not compatible, it was also necessary then to hold the parts in position with fixturing. Binding wires are used in other structures where solid fixturing was difficult.

After the structure such as faceplate 26 is fixtured, it is placed in a vapor phase apparatus during which the plated eutectic lead/tin alloy flows in the joints.

After vapor phase soldering, the structure, such as faceplate 26, is removed from the fixture and cleaned with methyl chloroform.

Another structure assembled using this process was an aluminum waveguide with flanges. The above steps were used except solder wire preforms, 0.03 inches in diameter, were placed in joints where gravity would hold the preforms in place. Other joints had solder plated therein. Steel binding wires further assisted in clamping the waveguide together.

Using this process, waveguides having 20 microinches of finish were constructed with no degradation in the surfaces. Dip brazing of similar structures provides a finish of about 40 microinches or worse. Since microwave currents flow only at the surface of a conductor, this roughness can contribute significantly to the ohmic loss. The skin depth of aluminum at 10 GHz is 78 microinches.

From the above, it can be clearly seen that the present invention provides a process for joining aluminum parts to make assemblies such as waveguide manifolds and faceplates for radar equipment; for joining parts made of metals, other than aluminum, that will accept plated solder; and for sequentially joining metal subassemblies which have been previously brazed or high temperature soldered.

Clearly, many modifications and variations of the present invention are possible in light of the above teachings and it is therefore understood, that within the inventive scope of the inventive concept, the invention may be practiced otherwise than specifically claimed.

What is claimed is:

1. A process for joining aluminum parts having a plurality of joints to form a lightweight structure, said process comprising the steps of:
   cleaning said parts to remove foreign matter from the surfaces of said parts;
   masking selectively areas of said surface to prevent the deposition of solderable metals thereupon;
   depositing a first layer of metal selectively upon said surfaces to prevent oxidation;
   depositing a second layer of metal selectively upon said first layer of metal, said second layer being solderable;
   placing selectively an eutectic alloy solder on said second layer where joints are to be formed;
   coating said solder and said joints with flux;
   fixturing said parts to form said structure, a fixture for fixturing being made of a metal having a lower coefficient of expansion than aluminum, said eutectic alloy solder being held in said joints by said fixture before heating, upon heating, said fixture holding said joints together;
   heating said structure being fixtured in a vapor phase apparatus to cause said solder to flow in said joints simultaneously, said heating being at about 215° C;
   cooling said structure, said structure becoming loosely held by said fixture after cooling;
   removing said structure from said fixturing;
   removing masking; and
   cleaning said structure of residue matter.

* * * * *